US009956977B2

(12) United States Patent
Kubo et al.

(10) Patent No.: US 9,956,977 B2
(45) Date of Patent: May 1, 2018

(54) PUSHCART

(71) Applicant: MURATA MANUFACTURING CO., LTD., Kyoto (JP)

(72) Inventors: Masayuki Kubo, Kyoto (JP); Yoshitaka Hane, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days. days.

(21) Appl. No.: 15/386,419

(22) Filed: Dec. 21, 2016

(65) Prior Publication Data

US 2017/0096157 A1  Apr. 6, 2017

Related U.S. Application Data

(63) Continuation of application No. PCT/JP2015/067953, filed on Jun. 23, 2015.

(30) Foreign Application Priority Data

Jun. 23, 2014  (JP) .................................. 2014-128283

(51) Int. Cl.
*B62B 3/02* (2006.01)
*B62B 5/06* (2006.01)
(Continued)

(52) U.S. Cl.
CPC .................. *B62B 3/02* (2013.01); *B62B 5/06* (2013.01); *B62B 7/008* (2013.01); *B62B 7/04* (2013.01); *B62B 2203/02* (2013.01)

(58) Field of Classification Search
CPC .. B60R 21/00; B62B 7/00; B62B 9/00; B62B 9/005
See application file for complete search history.

(56) References Cited

U.S. PATENT DOCUMENTS 6,062,600 A  5/2000  Kamen et al.
2006/0102670 A1*  5/2006  Hassett ................ A44B 19/262
224/407

FOREIGN PATENT DOCUMENTS

JP  2000-514680 A  11/2000
JP  2006-160135 A  6/2006
(Continued)

OTHER PUBLICATIONS

International Search Report issued in Patent Application No. PCT/JP2015/067953 dated Jul. 28, 2015.
(Continued)

*Primary Examiner* — John D Walters
*Assistant Examiner* — James J Triggs
(74) *Attorney, Agent, or Firm* — Pearne and Gordon LLP

(57) ABSTRACT

A pushcart according to the present disclosure provides a warning on the basis of a first weight at a position outside a region between a shaft of front wheels and a shaft of rear wheels when viewed from the vertical direction and a predetermined weight. For example, the predetermined weight is the weight on a mounting portion located between the shaft of the front wheels and the shaft of the rear wheels when viewed from the vertical direction. When the first weight is larger than the predetermined weight, an informing unit can provide a warning by using a sound, light, and the like and enable a user to recognize that there is a possibility that the pushcart will turn over.

18 Claims, 13 Drawing Sheets

(51) Int. Cl.
B62B 7/00 (2006.01)
B62B 7/04 (2006.01)

(56) References Cited

FOREIGN PATENT DOCUMENTS

| | | |
|---|---|---|
| JP | 2011-011577 A | 1/2011 |
| JP | 2011-046367 A | 3/2011 |
| JP | 3173090 U | 1/2012 |
| JP | 2014-021676 A | 2/2014 |

OTHER PUBLICATIONS

Written Opinion issued in Patent Application No. PCT/JP2015/067953 dated Jul. 28, 2015.

* cited by examiner

DIRECTION OF MOVEMENT ←

HEIGHT DIRECTION ↑
DEPTH DIRECTION →

PUSHCART

This is a continuation of International Application No. PCT/JP2015/067953 filed on Jun. 23, 2015 which claims priority from Japanese Patent Application No. 2014-128283 filed on Jun. 23, 2014. The contents of these applications are incorporated herein by reference in their entireties.

BACKGROUND

Technical Field

The present disclosure relates to a pushcart that includes wheels and on which baggage is to be placed.

In the related art, for example, a stroller has been used as a pushcart that includes wheels and on which baggage is to be placed. For example, a stroller includes a pair of front wheels, a pair of rear wheels, a seat on which a child is to be placed, and a handle portion to be held by a user. Note that, in the present application, a person (child) is included in baggage to be placed on a pushcart.

In a stroller such as described above, a handle portion is located outside a region between front wheels and rear wheels and is located on, for example, the side opposite to the direction of movement of the stroller in order to enable a user to easily hold the handle portion. There is a case where baggage (e.g., a bag) of the user is hung on or accommodated in the handle portion or a portion in the vicinity of the handle portion. Thus, in the stroller, there is a case where the weight of the baggage is applied to a position outside the region between the front wheels and the rear wheels, and there is a possibility that the stroller will turn over.

Accordingly, for example, a stroller described in Patent Document 1 stabilizes its position by disposing heavy items, such as a battery and a motor, between front wheels and rear wheels.

Patent Document 1: Japanese Unexamined Patent Application Publication No. 2011-46367

BRIEF SUMMARY

However, even when the position of the stroller described in Patent Document 1 is stable, there is a possibility that the stroller will turn over when a larger load is applied to the handle portion, and the stroller described in Patent Document 1 gives no consideration to the possibility that the stroller will turn over. In other words, with the stroller described in Patent Document 1, a user cannot determine whether the stroller will turn over before the stroller turns over.

In addition, the total weight of the stroller described in Patent Document 1 increases due to the heavy items for stabilizing the position of the stroller.

Accordingly, the present disclosure provides a pushcart that prevents the pushcart from turning over without necessarily increasing the total weight of the pushcart.

A pushcart according to a first aspect of the present disclosure includes first wheels, second wheels, a first mounting portion located outside a region between a shaft of the first wheels and a shaft of the second wheels when viewed from a vertical direction (a direction perpendicular to a surface of the ground where the pushcart is placed), a first sensor that detects a first weight on the first mounting portion, and an informing unit that provides a warning based on the first weight detected by the first sensor and a predetermined weight.

The predetermined weight corresponds to the weight of the pushcart. For example, the predetermined weight may be the weight of the pushcart itself or may be the weight on a mounting portion excluding the first mounting portion. For example, when the first weight exceeds a predetermined threshold and is larger than the predetermined weight, the informing unit can provide a warning by using a sound, light, and the like and enable a user to recognize that there is a possibility that the pushcart will turn over. As a result, the pushcart according to the present disclosure can prevent the pushcart from turning over without necessarily stabilizing the position of the pushcart by using a heavy item.

The informing unit may calculate the position of the center of gravity of the pushcart based on the first weight and the predetermined weight and may provide the warning when the position of the center of gravity, which has been calculated, is outside the region between the shaft of the first wheels and the shaft of the second wheels when viewed from the vertical direction.

In addition, the informing unit may calculate the position of the center of gravity of the pushcart based on the first weight and the predetermined weight and may provide the warning when the position of the center of gravity, which has been calculated, is outside a predetermined region when viewed from the vertical direction. The predetermined region may be set within the region between the shaft of the first wheels and the shaft of the second wheels when viewed from the vertical direction.

For example, the informing unit may provide the warning at least when the position of the center of gravity of the pushcart is beyond the predetermined region and is positioned close to, for example, the rear wheels. As a result, the pushcart can prevent, with higher certainty, the pushcart from turning over.

A condition (the position of the center of gravity is located outside the region between the first wheels and the second wheels when viewed from the vertical direction) under which the informing unit provides the warning varies depending on, for example, the inclination angle of a road surface on which the pushcart is located. Accordingly, the pushcart may further include an inclination-angle sensor that detects the inclination angle of the pushcart, and the informing unit may provide the warning based on an inclination angle detected by the inclination-angle sensor, the first weight, and the predetermined weight.

The pushcart according to the present disclosure may have a configuration described below instead of including the informing unit for preventing the pushcart from turning over.

A pushcart according to a second aspect of the present disclosure includes a support member whose first end is attached to the pushcart and a turnover preventing portion that causes a second end of the support member to move so as to be outside the region between the shaft of the first wheels and the shaft of the second wheels based on the first weight detected by the first sensor and the predetermined weight.

According to the present aspect, even if there is a possibility that the pushcart will incline toward a first weight portion and turn over, the second end of the support member moves toward the first weight portion beforehand so as to support a main body, and thus, the pushcart can be prevented from turning over.

Similar to the above-mentioned informing unit, the turnover preventing portion may calculate the position of the center of gravity of the pushcart based on the first weight and the predetermined weight and may cause the second end of the support member to move so as to be outside the region between the shaft of the first wheels and the shaft of the second wheels when the position of the center of gravity, which has been calculated, is located outside the region when viewed from the vertical direction.

In addition, similar to the above-mentioned informing unit, the turnover preventing portion may calculate the position of the center of gravity of the pushcart based on the first weight and the predetermined weight and may cause the second end of the support member to move so as to be outside the region when the position of the center of gravity, which has been calculated, is located outside a predetermined region when viewed from the vertical direction. The predetermined region may be set within the region between the shaft of the first wheels and the shaft of the second wheels when viewed from the vertical direction.

Similar to the pushcart that includes the informing unit, the pushcart that includes the turnover preventing portion may further include an inclination-angle sensor that detects the inclination angle of the pushcart, and the turnover preventing portion may cause the second end of the support member to move so as to be outside the region between the shaft of the first wheels and the shaft of the second wheels based on an inclination angle detected by the inclination-angle sensor, the first weight, and the predetermined weight.

The pushcarts according to the aspects of the present disclosure may calculate the predetermined weight detected by a second weight. For example, each of the pushcarts may include the second mounting portion located between the shaft of the first wheels and the shaft of the second wheels when viewed from the vertical direction and a second sensor that detects, as the predetermined weight, a second weight on the second mounting portion.

As a result, even if the second weight on the second mounting portion changes, the pushcart detects the changed second weight as the predetermined weight.

In addition, in the case where the weight on the second mounting portion does not change, the pushcart may further include an input unit into which the predetermined weight is input.

In this case, the weight of the pushcart itself or the fixed weight on the second mounting portion is input into the input unit.

Note that, in the pushcarts according to the aspects of the present disclosure, the first wheels and the second wheels may be electrically operated so as to rotate or may be manually operated so as to rotate.

A pushcart according to the present disclosure provides a warning, before the pushcart turns over, on the basis of the weight at a position outside a region between a shaft of first wheels and a shaft of second wheels when viewed from the vertical direction and a predetermined weight and supports the pushcart by using a support member, and thus, the pushcart can prevent the pushcart from turning over without necessarily stabilizing the position of the pushcart by using a heavy item.

DETAILED DESCRIPTION

Figure 1A:
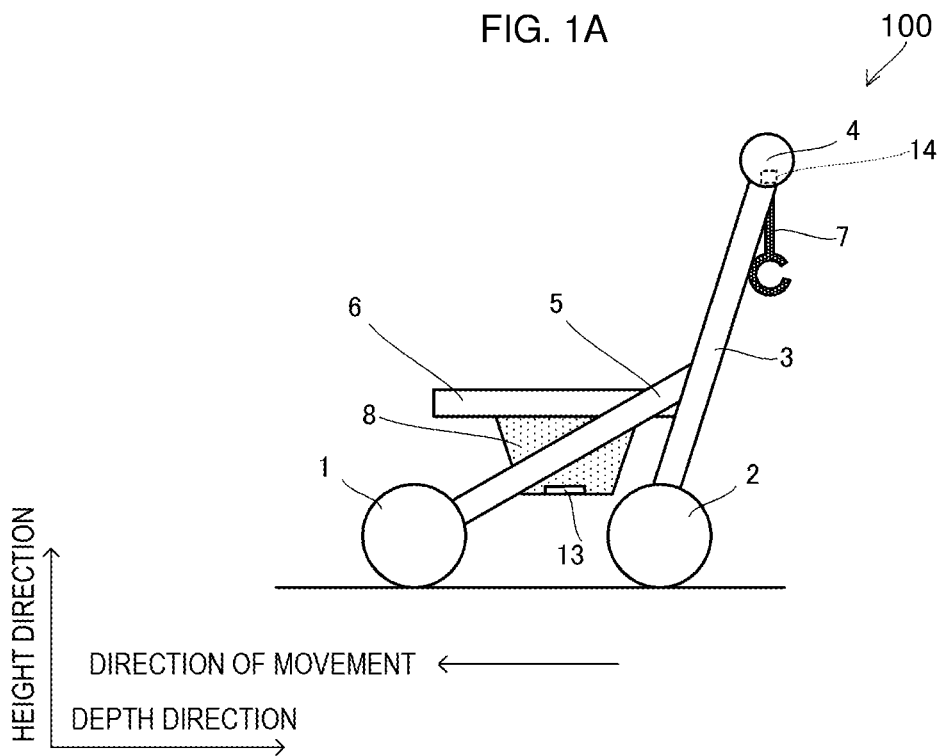
FIG. 1A is a side view of a stroller according to a first embodiment of the present disclosure.
Figure 1B:
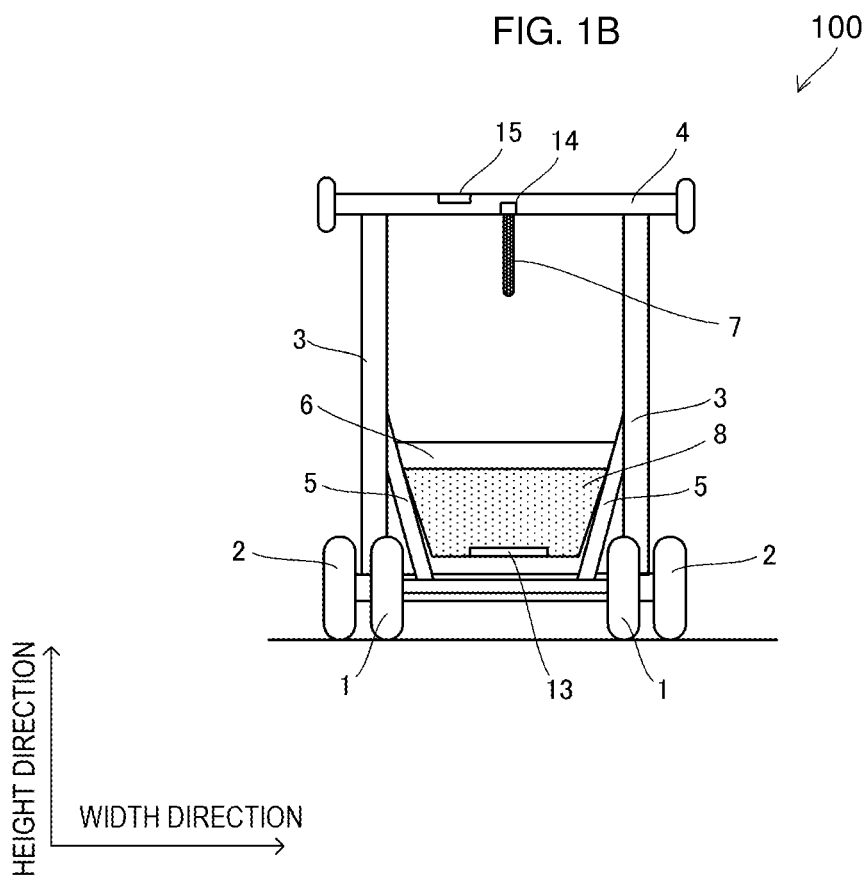
FIG. 1B is a front view of the stroller.
Figure 2:
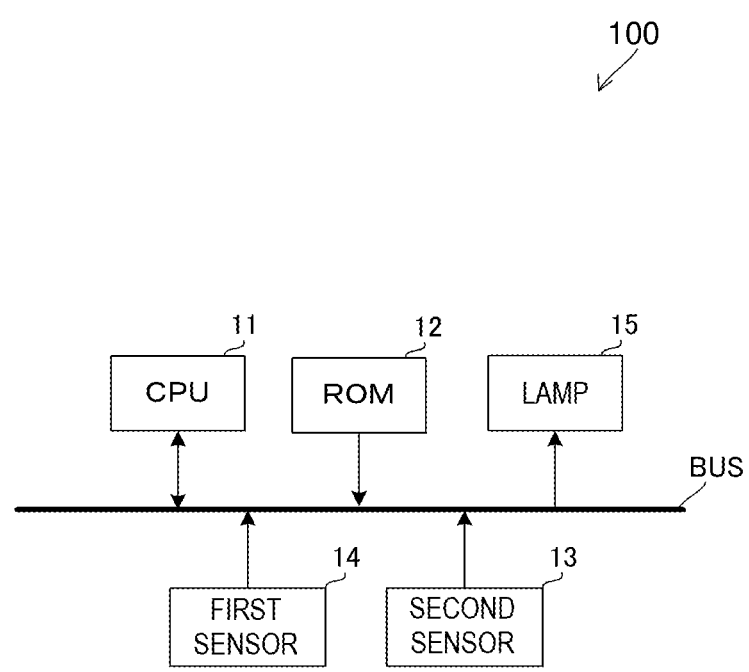
FIG. 2 is a block diagram illustrating part of the configuration of the stroller according to the first embodiment.

A stroller 100 according to a first embodiment will now be described with reference to FIG. 1A, FIG. 1B, and FIG. 2. FIG. 1A is a side view of the stroller 100, and FIG. 1B is a front view of the stroller 100. FIG. 2 is a block diagram illustrating part of the configuration of the stroller 100. In FIG. 1A, the stroller 100 is used such that the stroller 100 is moved in the negative depth direction. In the following description, in FIG. 1A, a front view and a rear view respectively correspond to a diagram illustrating the stroller 100 when viewed from the positive depth direction and a diagram illustrating the stroller 100 when viewed from the negative depth direction.

As illustrated in FIG. 1A and FIG. 1B, the stroller 100 includes a pair of front wheels 1, a pair of rear wheels 2, a pair of main frames 3, a handle portion 4, a pair of sub frames 5, and a seat-holding frame 6.

The pair of front wheels 1 are rotatably supported by the end portions of a shaft extending in a width direction. The pair of rear wheels 2 are rotatably supported by the end portions of another shaft extending in the width direction. The front wheels 1 and the rear wheels 2 are capable of freely rotating around the corresponding shafts each extending in the width direction.

The lower ends of the main frames 3 are connected to the shaft of the rear wheels 2, and the upper ends of the main frames 3 are fixed to the handle portion 4. As illustrated in FIG. 1A, the main frames 3 are inclined in the positive depth direction with respect to the upward vertical direction (height direction).

As illustrated in FIG. 1B, the handle portion 4 is in the form of a shaft extending in the width direction and has a shape that enables a user to easily hold.

The lower end of each of the sub frames 5 is connected to the shaft of the front wheels 1, and the upper end of each of the sub frames 5 is fixed to a corresponding one of the main frames 3. As a result, each of the front wheels 1 and a corresponding one of the rear wheels 2 are separated from each other by a fixed gap in the depth direction. However, in the stroller 100, it is not necessary for the front wheels 1 and the corresponding rear wheels 2 to be constantly separated from each other by the fixed gap. For example, the stroller 100 may be folded by reducing the gaps between the front wheels 1 and the corresponding rear wheels 2 as a result of portions in which the sub frames 5 and the main frames 3 are connected to each other being unlocked and sliding upward with respect to the main frames 3.

The seat-holding frame 6 holds a seat 8, which will be described later. The seat-holding frame 6 has a frame shape extending in a direction parallel to a horizontal surface in a state where the stroller 100 is placed on a horizontal surface, and the seat-holding frame 6 has a U-shape which is open in the positive depth direction when viewed from the height direction. The end portions of the seat-holding frame 6 having the U shape are fixed to the main frames 3 and the sub frames 5.

The stroller 100 includes two mounting portions on each of which baggage is to be placed. A hook 7, which is one of the two mounting portions (first mounting portion), is held by the handle portion 4 so as to hang from the handle portion 4 as illustrated by the dark hatching in FIG. 1A and FIG. 1B. However, the hook 7 may be held by, for example, a portion of the main frames 3 in the vicinity of the handle portion 4 so as to hang from the portion. In addition, the first mounting portion is not limited to the hook 7. For example, the stroller 100 may include, instead of the hook 7, an accommodating portion having a pocket-like shape attached to the main frames 3 so as to be located between the main frames 3 in the width direction. In this case, a first sensor 14, which will be described later, is disposed at the bottom or the like of the accommodating portion.

A child is to be placed on the seat 8 (illustrated by the light hatching in FIG. 1A and FIG. 1B), which is the other of the two mounting portions (second mounting portion). The seat 8 has a bucket-like shape whose top surface and front surface are open. The seat 8 is fixed in place as a result of the upper edge thereof being held by the seat-holding frame 6. Although the actual stroller 100 includes a backrest portion inclined in the positive depth direction and a seat belt, the descriptions of the backrest portion and the like are omitted in the present embodiment.

The first sensor 14 is disposed at a portion in which the hook 7 and the handle portion 4 are connected to each other. A second sensor 13 is disposed on the bottom surface of the seat 8.

For example, the first sensor 14 and the second sensor 13 are each formed of a strain gauge whose electrical resistance varies in accordance with pressure applied thereto. The value of the pressure applied to the first sensor 14 and the value of the pressure applied to the second sensor 13 can be determined by determining the electrical resistance of each strain gauge. A value detected by the first sensor 14 corresponds to the weight on the hook 7, and a value detected by the second sensor 13 corresponds to the weight on the seat 8. However, the first sensor 14 and the second sensor 13 are not limited to the strain gauges and may be, for example, members that output variations in pressure values as variations in electrostatic capacitance values. It is desirable that the first sensor 14 and the second sensor 13 be lightweight semiconductor pressure sensors.

A lamp 15 is disposed on the top surface of the handle portion 4. The lamp 15 is formed of, for example, an LED.

The stroller 100 warns of turning over thereof by switching on the lamp 15 on the basis of a value detected by the first sensor 14 and a predetermined weight. Here, the predetermined weight corresponds to the weight of the stroller 100. In the present embodiment, although the weight on the seat 8 will be described as the predetermined weight, the predetermined weight may be the weight of the stroller 100.

As illustrated in FIG. 2, the first sensor 14, the second sensor 13, and the lamp 15 are connected to a bus. A CPU 11 and ROM 12 are also connected to the bus. Although the CPU 11 and the ROM 12 are not illustrated in FIGS. 1A and 1B, the CPU 11 and the ROM 12 are disposed at, for example, the bottom of the seat 8.

The CPU 11 runs a program stored in the ROM 12 by reading the program from the ROM 12 and expanding the program into RAM (not illustrated). The CPU 11 performs a turnover preventing process, which will be described later, by running the program. Note that since power consumption of the CPU 11 and the like is low, for example, the CPU 11 and the like operate as a result of power being supplied thereto by a power-supply source (not illustrated) such as a dry battery.

In the stroller 100, in the case where the first sensor 14 and the second sensor 13 are lightweight semiconductor pressure sensors and where the lamp 15 is a lightweight LED, the power-supply source (dry battery) may be light, and thus, the total weight of the stroller 100 can be reduced to a minimum value while preventing the stroller 100 from turning over.

Figure 3:
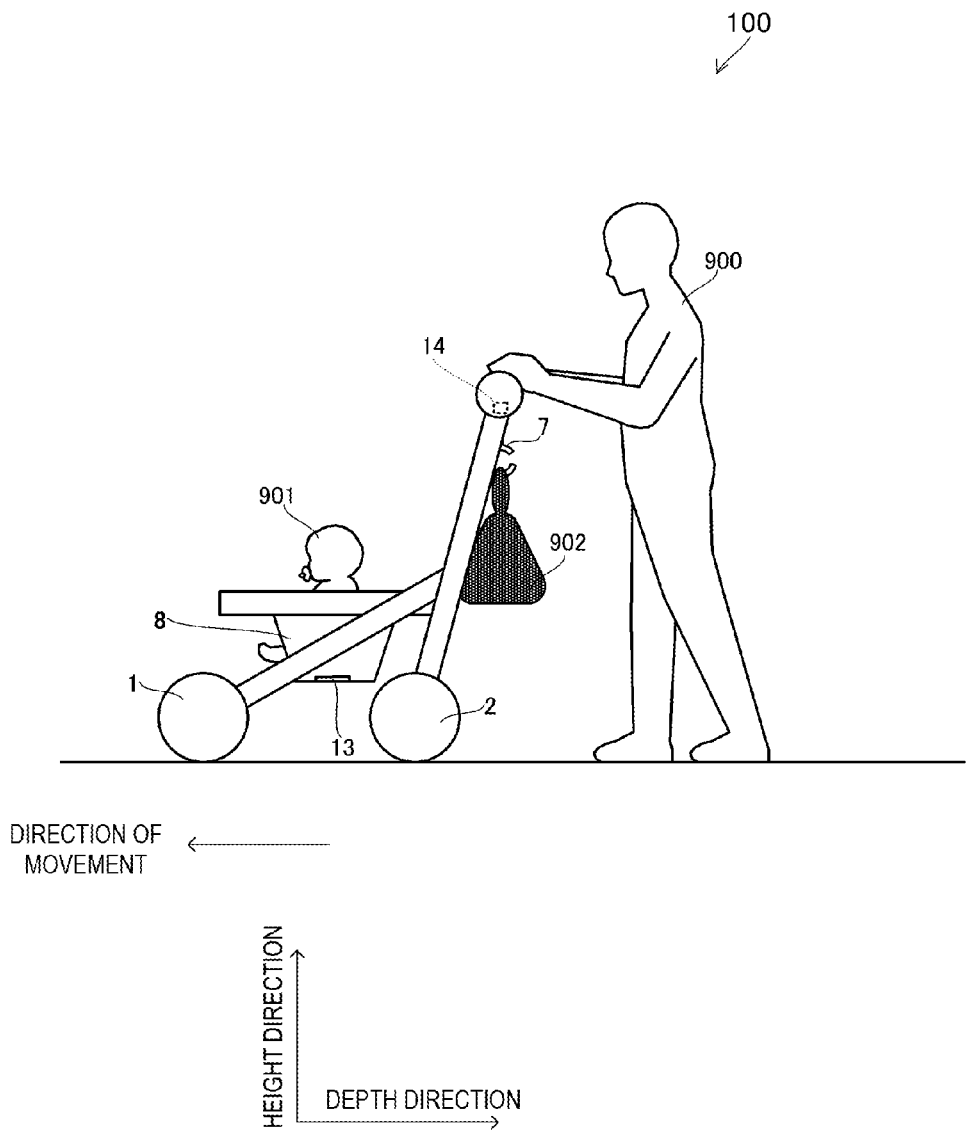
FIG. 3 is a side view illustrating an example of how to use the stroller according to the first embodiment.

An example of how to use the stroller 100 will now be described with reference to FIG. 3. FIG. 3 is a side view illustrating an example of how to use the stroller 100. When using the stroller 100, a user 900 holds the handle portion 4, and a child 901 is usually placed on the seat 8. In addition, in this example, the stroller 100 is used while baggage 902, such as a bag, is hung on the hook 7.

The stroller 100 calculates the position of the center of gravity of the entire stroller 100 (hereinafter referred to as center-of-gravity position of the entire stroller 100) on the basis of the weight of the child 901 and the weight of the baggage 902 and performs the turnover preventing process for preventing the stroller 100 from turning over. In the following description, the term "center-of-gravity position of the entire stroller 100" refers to a center-of-gravity position with respect to the sum of the weight of the stroller 100, the weight on the seat 8, and the weight on the hook 7.

Figure 4:
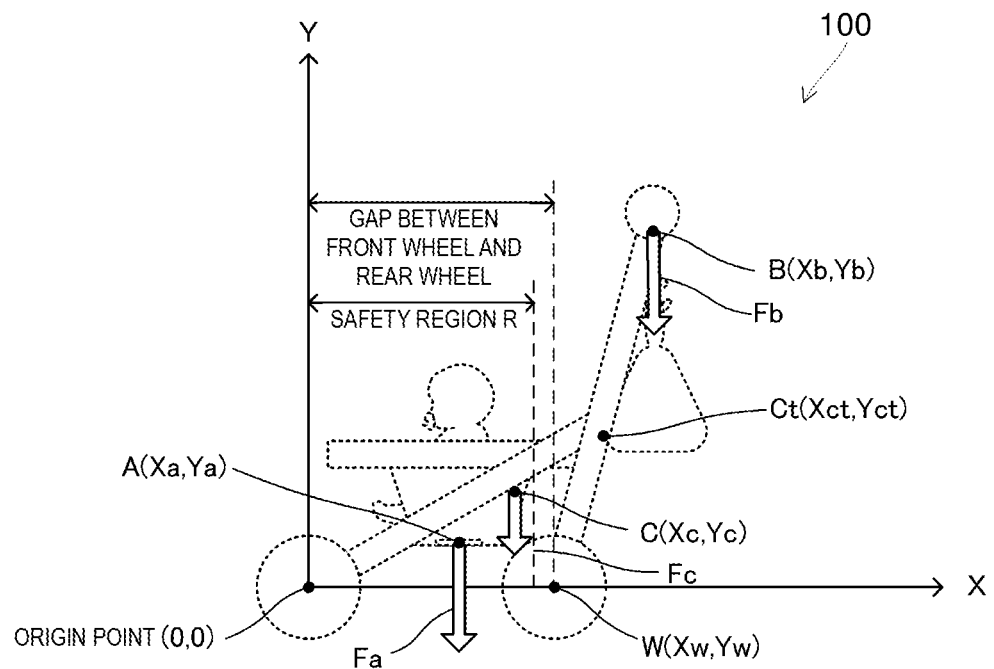
FIG. 4 is a diagram illustrating an example of how to calculate a center-of-gravity position.

FIG. 4 is a diagram illustrating an example of how to calculate a center-of-gravity position. Note that FIG. 4 illustrates the case where the stroller 100 is located on a road surface parallel to a horizontal surface. As illustrated in FIG. 4, for example, when the stroller 100 is viewed from the side, the position of the shaft of the front wheels 1 is an origin point (0, 0), and the X-axis direction and the Y-axis direction correspond to the positive depth direction and the height direction, respectively. A center-of-gravity position Ct (Xct, Yct) of the entire stroller 100 is determined by using Expression 1 and Expression 2, which are described below, and using a position W (Xw, Yw) of the shaft of the rear wheels 2, a position A (Xa, Ya) of the second sensor 13, a value Fa detected by the second sensor 13, a position B (Xb, Yb) of the first sensor 14, a value Fb detected by the first sensor 14, an initial center-of-gravity position C (Xc, Yc), and the weight Fc of the stroller 100.

$$Xct = \frac{Xa \cdot Fa + Xb \cdot Fb + Xc \cdot Fc}{Xa + Xb + Xc} \quad \text{[Math. 1]}$$

$$Yct = \frac{Ya \cdot Fa + Yb \cdot Fb + Yc \cdot Fc}{Ya + Yb + Yc} \quad \text{[Math. 2]}$$

The initial center-of-gravity position C is the center-of-gravity position of the stroller 100 in a state where no baggage is placed on the seat 8 or the hook 7, and the initial center-of-gravity position C is stored as an initial value in the ROM 12. Similarly, the weight Fc is the weight of the stroller 100 in a state where no baggage is placed on the seat 8 or the hook 7, and the weight Fc is stored as an initial value in the ROM 12. The position A (Xa, Ya) of the second sensor 13, the position B (Xb, Yb) of the first sensor 14, and the position W (Xw, Yw) of the shaft of the rear wheels 2 while the position (origin point) of the shaft of the front wheels 1 functions as a reference are also stored as initial values in ROM 12.

The stroller 100 switches on the lamp 15 on the basis of the calculated center-of-gravity position Ct (Xct, Yct). More specifically, in the case where the value Xct in the X-axis direction is larger than the value Xw of the position W of the shaft of the rear wheels 2 in the X-axis direction, the stroller 100 switches on the lamp 15 and enables the user 900 to recognize a warning. In other words, when the center-of-gravity position Ct is located outside a region between the shaft of the front wheels 1 and the shaft of the rear wheels 2 and is located on the side on which the first sensor 14 is disposed when viewed from the vertical direction, the stroller 100 switches on the lamp 15 and provides a warning. Note that, the stroller 100 may be set so as to not provide a warning in the case where the distance between the center-of-gravity position Ct and a region between the shaft of the front wheels 1 and the shaft of the rear wheels 2 is short even when the center-of-gravity position Ct is located outside the region when viewed from the vertical direction, that is, when it can be determined that the center-of-gravity position Ct is in a predetermined safety region, and the stroller 100 may be set so as to provide a warning only when the center-of-gravity position Ct is located outside the predetermined safety region.

As illustrated in FIG. 4, it is desirable that the stroller 100 switch on the lamp 15 when the center-of-gravity position Ct is located outside a safety region R when viewed from the vertical direction. However, the predetermined safety region R is a region between the origin point (position of the shaft of the front wheels 1) and a position spaced apart from the position W of the shaft of the rear wheels 2 toward the origin point by, for example, 5 cm. The stroller 100 can indicate sooner that there is a possibility that the stroller 100 will turn over by providing a warning when the center-of-gravity position Ct is located outside the safety region R when viewed from the vertical direction. A specific value may be set for the safety region R by taking into consideration the risk of turning over when the baggage 902, which is heavy, is hung on the hook 7 and when the child 901 is lifted up from the seat 8.

Note that, in the present embodiment, it is optional to determine the value Yct of the center-of-gravity position Ct in the Y-axis direction by using Expression 2 described above. However, by determining the value Yct in the Y-axis direction, for example, the stroller 100 can determine that its position is unstable as a result of the center-of-gravity position Ct being located too high.

The stroller 100 may include a plurality of pairs of the hooks 7 and the first sensors 14, and each of the hooks 7 may be held by the handle portion 4 so as to hang from the handle portion 4. In this case, the stroller 100 calculates the center-of-gravity position Ct by using the sum of the weights detected by the plurality of first sensors 14 as the above-mentioned detected value Fb.

The stroller 100 is not limited to having the configuration in which the first sensor 14 is disposed at the portion in which the hook 7 and the handle portion 4 are connected to each other. Two first sensors 14 may be disposed at portions in each of which the handle portion 4 and one of the main frames 3 are connected to each other, and the sum of the weight on the handle portion 4 including the weight of the baggage 902 on the hook 7 may be determined. As a result, when the center-of-gravity position Ct is located on the positive-depth-direction side with respect to the shaft of the rear wheels 2 due to the total weight on the handle portion 4 when viewed from the vertical direction or when the center-of-gravity position Ct is located outside the safety region R in the positive depth direction when viewed from the vertical direction, the stroller 100 can provide a warning. However, in the stroller 100, the first sensor 14 may be disposed on the top surface of the handle portion 4 in order to directly detect a force applied by the user 900 that presses down the handle portion 4.

The stroller 100 is not limited to being pushed and moved by the user 900, and for example, the wheels of the stroller 100 may be driven by a motor. Even in the case where the stroller 100 is configured to be electrically operated, it is not necessary for the stroller 100 to include a heavy item used for only preventing the stroller 100 from turning over, and the stroller 100 can be prevented from turning over.

Note that the stroller 100 is not limited to warning by calculating the center-of-gravity position Ct and may provide a warning when the detected value Fb is larger than the detected value Fa by a predetermined amount.

In addition, the stroller 100 is not limited to providing a warning by switching on the lamp 15 and may provide a warning by generating a sound or a vibration. Alternatively, the stroller 100 may provide a warning by combining the above warning methods, which are switching on the lamp 15, generating a sound, and generating a vibration. Furthermore, in the case where the stroller 100 has a plurality of warning methods, the stroller 100 may include a selection unit that selects a warning method to be enabled.

The present embodiment is not limited to the stroller 100 in which a child is to be placed and may be applied to a pushcart for elderly people or a trolley that includes the seat 8 on which baggage is to be placed.

Figure 5A:
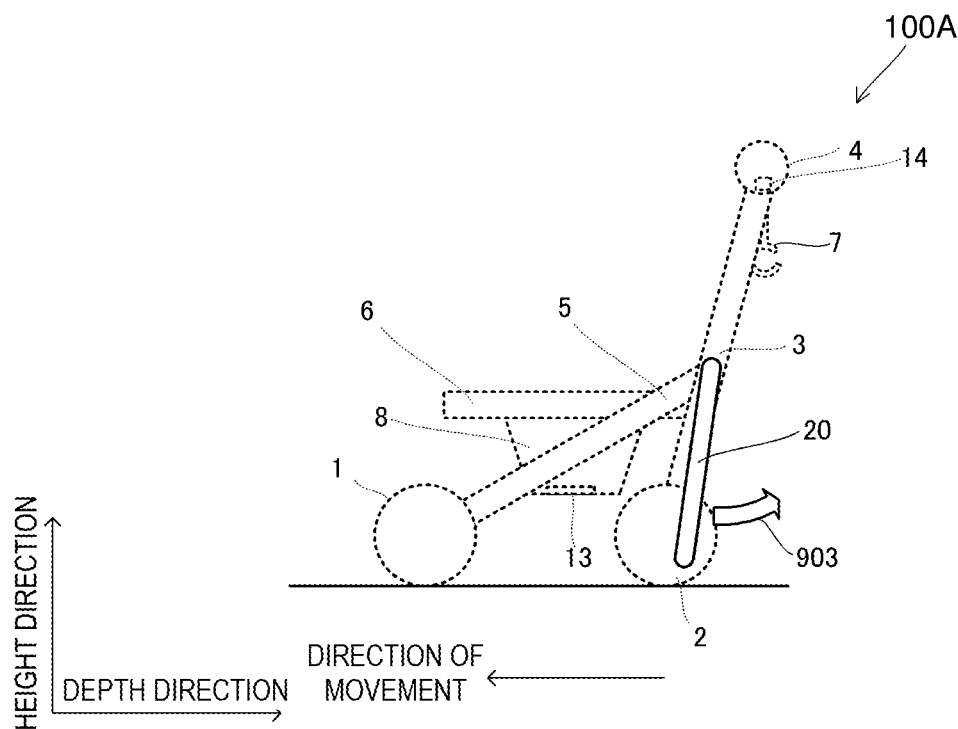
FIG. 5A is a side view of the stroller according to a second embodiment.
Figure 5B:
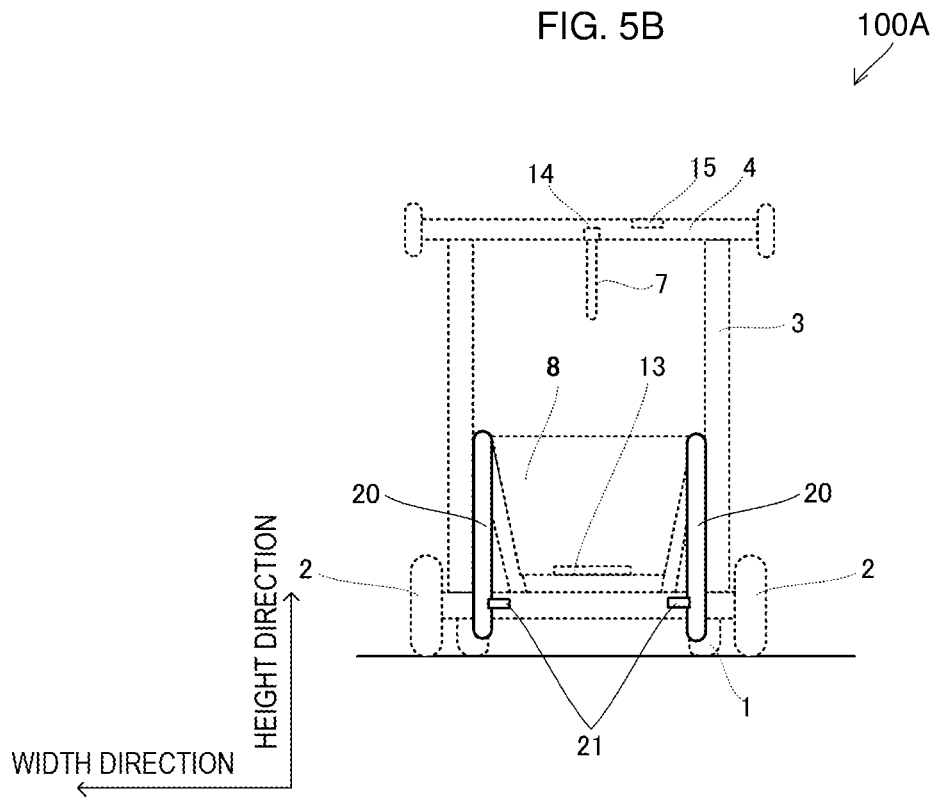
FIG. 5B is a rear view of the stroller.
Figure 6:
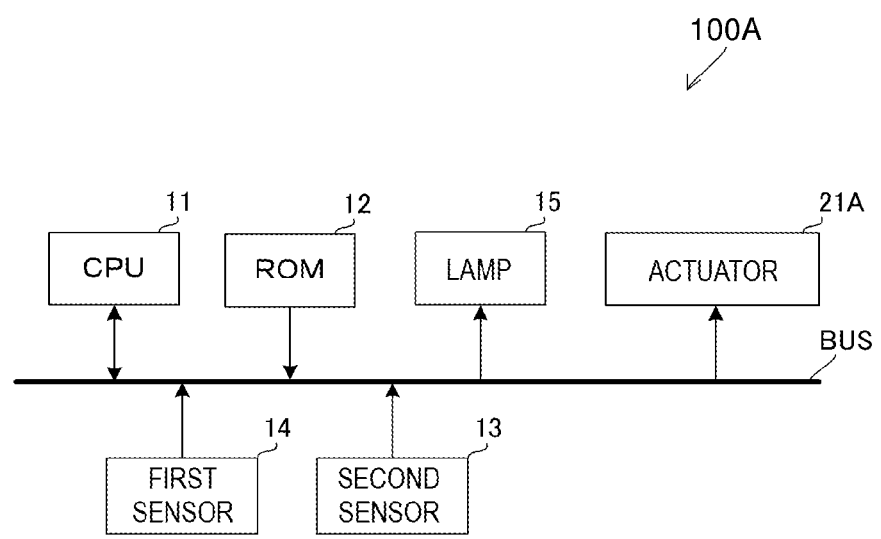
FIG. 6 is a block diagram illustrating part of the configuration of the stroller according to the second embodiment.

A stroller 100A according to a second embodiment will now be described with reference to FIG. 5A, FIG. 5B, and FIG. 6. FIG. 5A is a side view of the stroller 100A, and FIG. 5B is a rear view of the stroller 100A. FIG. 6 is a block diagram illustrating part of the configuration of the stroller 100A. Note that, in FIG. 5A and FIG. 5B, components excluding support members 20 are indicated by dotted lines in order to describe the support members 20.

The stroller 100A is obtained by adding a turnover preventing portion to the stroller 100 according to the first embodiment. However, the stroller 100A does not need to include the lamp 15. The description of the configuration of the stroller 100A that is the same as that of the stroller 100 will be omitted.

When there is a possibility that the stroller 100A will incline in the positive depth direction and turn over, the turnover preventing portion of the stroller 100A prevents the stroller 100A from turning over by moving the support members 20 beforehand in the positive depth direction so as to support the stroller 100A by using the pair of support members 20.

As illustrated in FIG. 5A and FIG. 5B, the pair of support members 20 each have a rod-like shape. The upper ends of the support members 20 are fixed to the main frames 3. The support members 20 are capable of freely rotating in a pitch direction while portions in each of which one of the main frames 3 and a corresponding one of the support members 20 are connected to each other serve as fulcrums. Note that the rotation range of each of the support members 20 is limited to a predetermined angle (e.g., 30 degrees). Each of the support members 20 is urged by, for example, a spring or the like in the pitch direction (direction indicated by an outlined arrow in FIG. 5A).

In a state where the stroller 100A is not likely to turn over, the lower ends of the support members 20 are fixed to the shaft of the rear wheels 2 by locking mechanisms 21. As a result, in a state where the stroller 100A is not likely to turn over, each of the support members 20 is fixed along a corresponding one of the main frames 3, and thus, the support members 20 do not hinder the user 900 from walking.

Each of the locking mechanisms 21 includes an actuator 21A. As illustrated in FIG. 6, each of the actuators 21A is connected to the BUS to which the CPU 11 and the like are connected. Each of the actuator 21A receives a driving signal from the CPU 11 so as to cause the corresponding locking mechanism 21 to move parallel to the width direction.

Figure 7A:
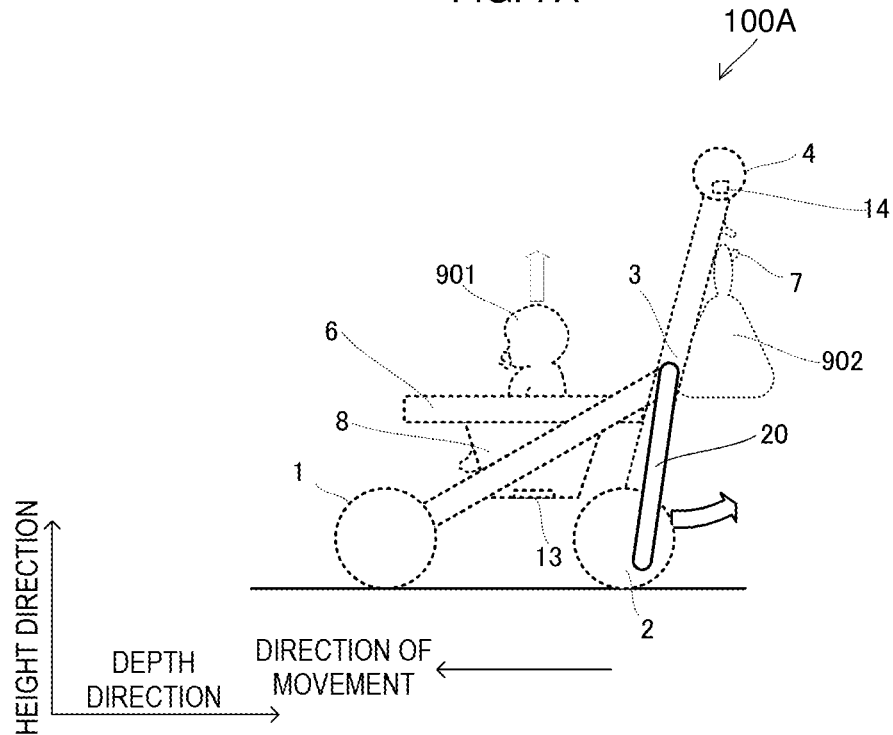
FIG. 7A is a side view illustrating the stroller at the timing at which the center-of-gravity position of the stroller is changed.
Figure 7B:
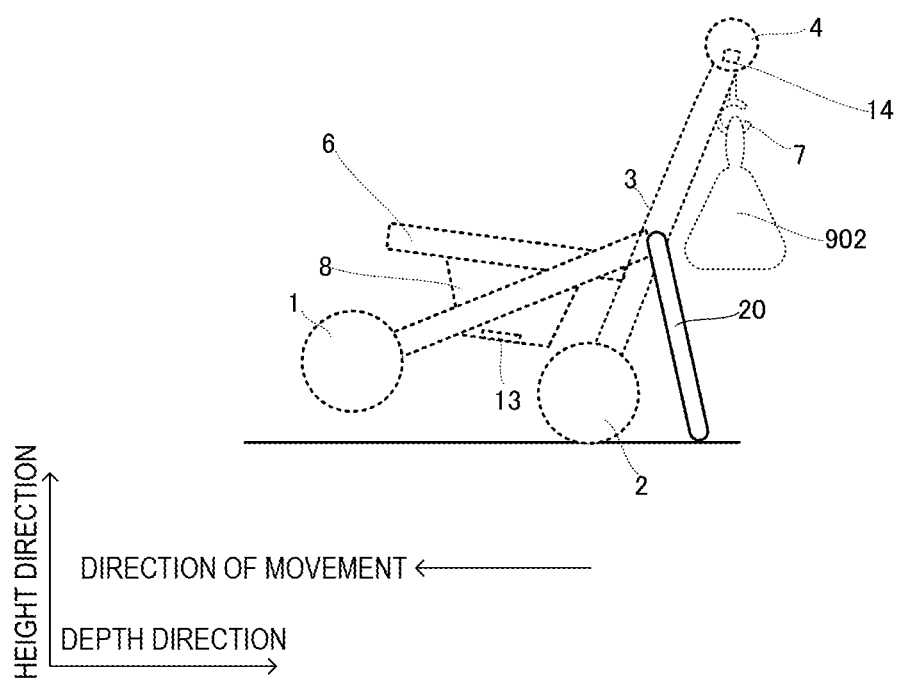
FIG. 7B is a side view illustrating the stroller after the center-of-gravity position of the stroller has been changed.

Operation of the stroller 100A will now be described with reference to FIG. 7A and FIG. 7B. FIG. 7A is a side view illustrating the stroller at the timing at which the center-of-gravity position of the stroller is changed, and FIG. 7B is a side view illustrating the stroller after the center-of-gravity position of the stroller has been changed. Note that, in FIG. 7A and FIG. 7B, components excluding the support members 20 are indicated by dotted lines in order to describe the operations of the support members 20.

For example, as illustrated in FIG. 7A, when the child 901 is lifted up from the seat 8, the center-of-gravity position Ct is located further toward the positive-depth-direction side than the shaft of the rear wheels 2 is when viewed from the vertical direction. When the center-of-gravity position Ct is located further toward the positive-depth-direction side than the shaft of the rear wheels 2 is when viewed from the vertical direction or when the center-of-gravity position Ct is located on the positive-depth-direction side beyond a predetermined safety region, the stroller 100A unlocks the lower ends of the support members 20 by driving the actuators 21A so as to cause the locking mechanisms 21 to move in the width direction. Then, as illustrated in FIG. 7B, each of the support members 20 is caused to rotate in the pitch direction by an urging force of the corresponding spring or the like, and the lower ends of the support members 20 move in the positive depth direction. As a result, even if the stroller 100A inclines in the positive depth direction, the stroller 100A is supported by the rear wheels 2 and the lower ends of the support members 20, and consequently, the stroller 100A can be prevented from turning over.

Note that the stroller 100A does not need to include the pair of support members 20 and may include only one support member 20. In addition, the shape and the operation of each of the support members 20 are not limited to the above-described examples. For example, the stroller 100A may have a configuration in which the stroller 100A is prevented from turning over as a result of an auxiliary wheel, which is located between the pair of rear wheels 2, projecting in the positive depth direction and the downward vertical direction (direction opposite to the height direction).

Note that, in the stroller 100 and the stroller 100A, which have been described above, the main frames 3 may incline not only in the positive depth direction but also in the negative depth direction.

Figure 8A:
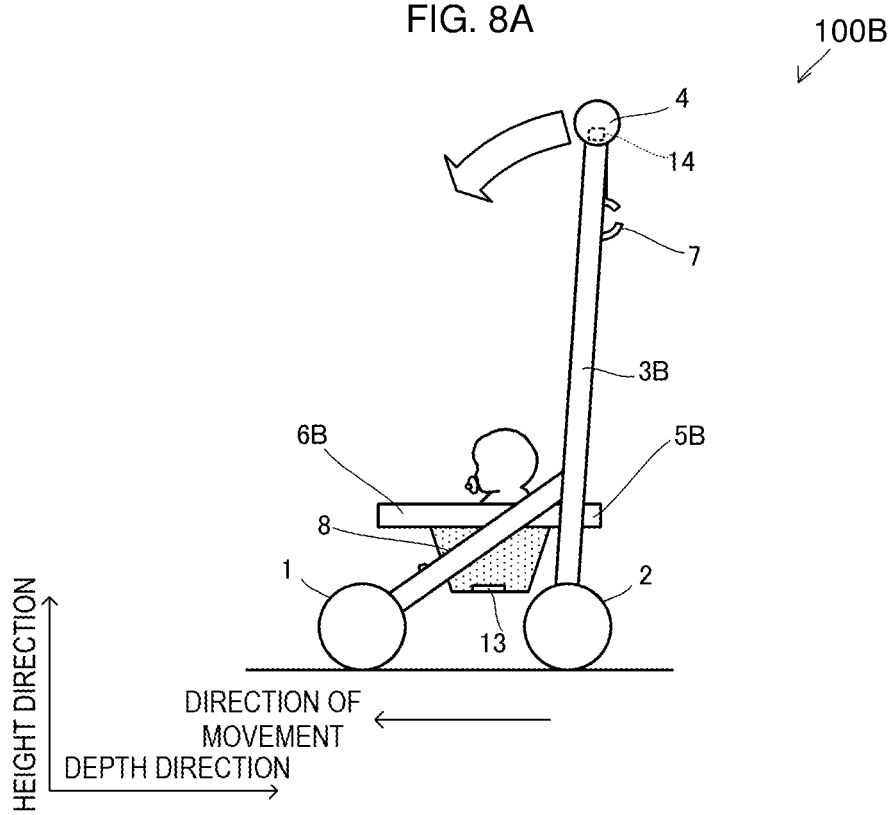
FIG. 8A is a side view of a bidirectional stroller whose main frames are inclined in the positive depth direction.
Figure 8B:
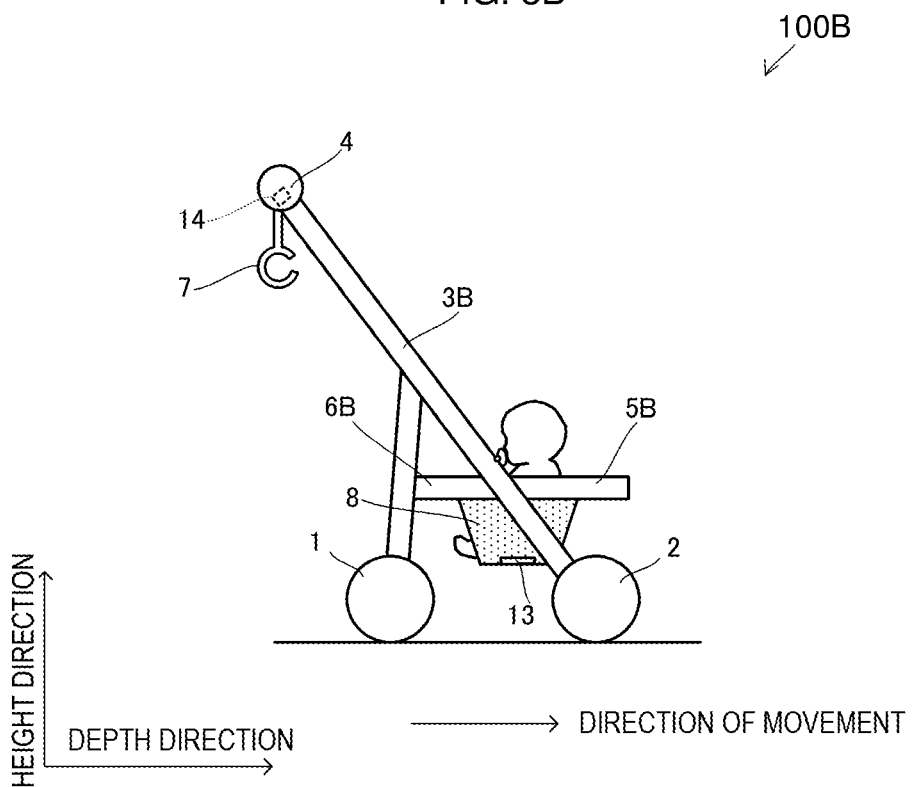
FIG. 8B is a side view of the bidirectional stroller whose main frames are inclined in the negative depth direction.

For example, as illustrated in FIG. 8A which is a side view, in a bidirectional stroller 100B, main frames 3B, sub frames 5B, a seat-holding frame 6B are unlocked by performing a switching operation of the handle portion 4, and the main frames 3B rotate in the pitch direction indicated by the outlined arrow. When the main frames 3B have rotated so as to be inclined in the negative depth direction, as illustrated in FIG. 8B, the main frames 3B, the sub frames 5B, and the seat-holding frame 6B are locked again.

In the bidirectional stroller 100B such as that described above, at least the position B of the first sensor 14 with respect to the position of the shaft of the front wheels 1 changes between a case in which the main frames 3B are inclined in the positive depth direction and a case in which the main frames 3B are inclined in the negative depth direction. Similar to the position B of the first sensor 14, the position A of the second sensor 13, the initial center-of-gravity position C, and the gaps between the front wheels 1 and the rear wheels 2 (corresponding to the position W of the shaft of the rear wheels 2) may also sometimes change.

Accordingly, in the stroller 100B, for each inclination directions in which the main frames 3B are inclined, the position A of the second sensor 13, the position B of the first sensor 14, the initial center-of-gravity position C, and the gaps between the front wheels 1 and the rear wheels 2 are stored in the ROM 12 as the conditions under which the center-of-gravity position Ct is calculated. The stroller 100B detects the positions of the main frames 3B (corresponding to one of the inclination directions). Then, the stroller 100B reads the conditions corresponding to the detected positions from the ROM 12 and calculates the center-of-gravity position Ct. Note that the positions of the main frames 3B may be detected by, for example, using an inclination-angle sensor or by detecting positions at which the main frames 3B and other frames are locked together.

It is desirable that the first sensor 14 be configured to obtain the weight of the baggage 902 regardless of the positions of the main frames 3B. In the case where the detected value Fb varies depending on the positions of the main frames 3, the first sensor 14 may correct the detected value Fb. As a result, the pressure value detected by the first sensor 14 is constantly equal to the weight of the baggage 902. Note that, the correction amount for each position of the main frames 3 is stored in the ROM 12.

Figure 9A:
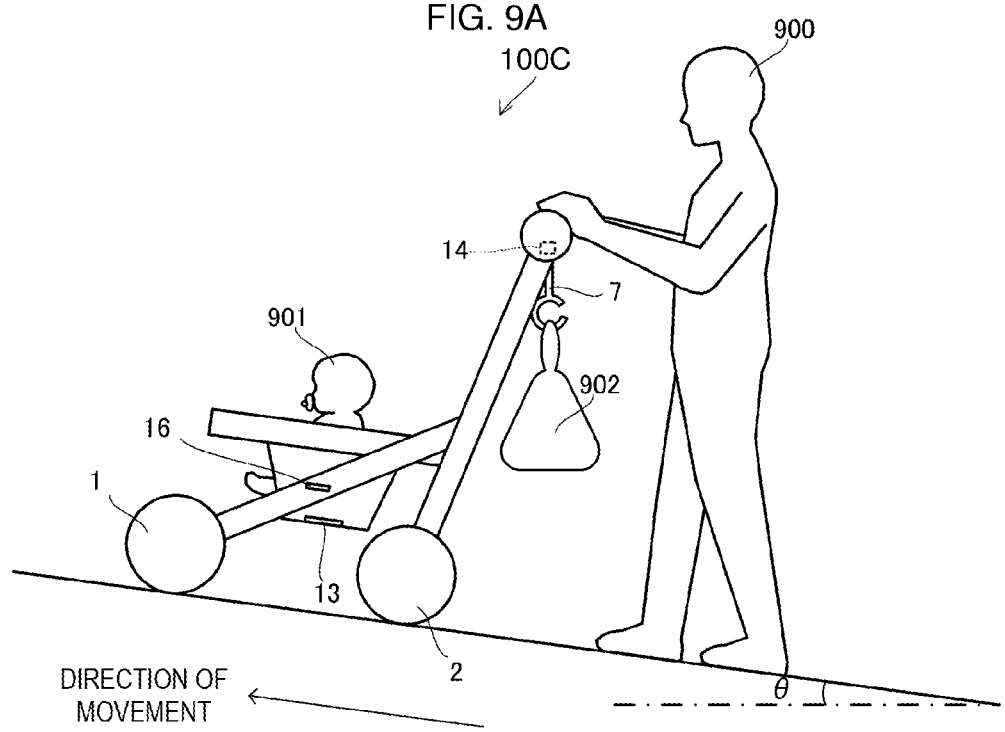
FIG. 9A is a side view of a stroller according to a third embodiment.
Figure 9B:
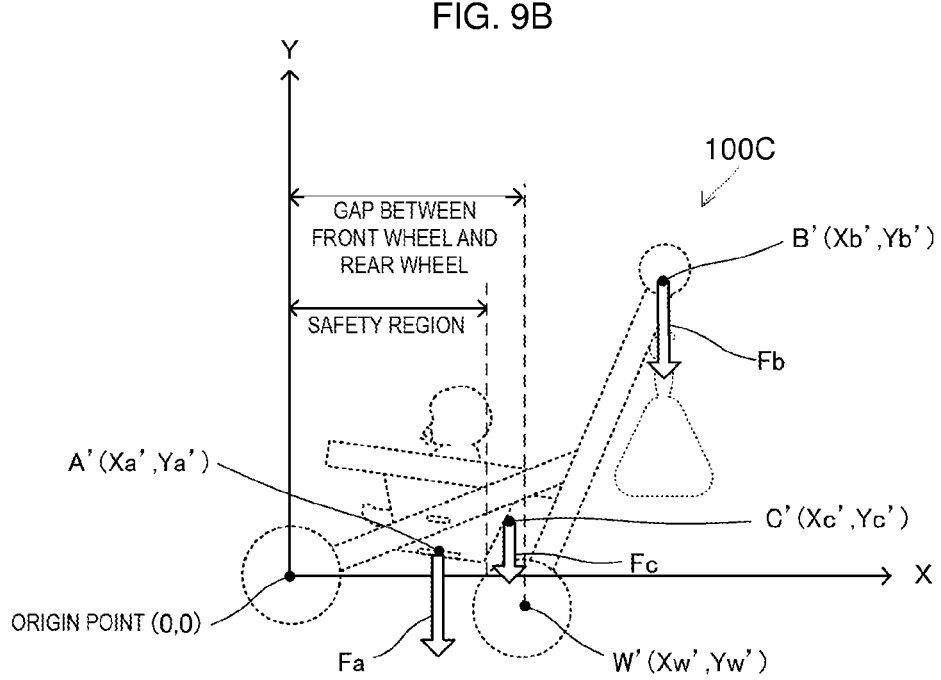
FIG. 9B is a diagram illustrating an example of how to calculate a center-of-gravity position according to the third embodiment.

A stroller 100C according to a third embodiment will now be described with reference to FIG. 9A and FIG. 9B. FIG. 9A is a side view of the stroller 100C, and FIG. 9B is a diagram illustrating an example of how to calculate a center-of-gravity position.

The stroller 100C detects its inclination angle and prevents the stroller 100C from turning over on the basis of the detected inclination angle, the value Fa detected by the second sensor 13, and the value Fb detected by the first sensor 14. The description of the configuration of the stroller 100C that is the same as that of the stroller 100 according to the first embodiment will be omitted.

For example, in the stroller 100C, an inclination-angle sensor 16 is mounted on one of the sub frames 5. The mounting angle and the like of the inclination-angle sensor 16 are adjusted such that the inclination angle of the inclination-angle sensor 16 with respect to the upward vertical direction is 0 degrees when the stroller 100C is placed on a road surface parallel to a horizontal surface. The inclination-angle sensor 16 detects the inclination angle thereof in the pitch direction with respect to the upward vertical direction and outputs a signal representing the inclination angle to the CPU 11. Note that the inclination angle becomes a positive value when the stroller 100C is inclined in the positive depth direction.

As illustrated in FIG. 9A, when the inclination-angle sensor 16 is located on an upward slope inclined with respect to a horizontal surface at an inclination angle θ, the inclination-angle sensor 16 outputs a signal representing the inclination angle θ.

Unlike the stroller 100, the stroller 100C calculates the center-of-gravity position Ct by also using the inclination angle θ as one of the conditions. More specifically, the stroller 100C corrects the position W (Xw, Yw) of the shaft of the rear wheels 2, the position A (Xa, Ya) of the second sensor 13, the position B (Xb, Yb) of the first sensor 14, and the initial center-of-gravity position C (Xc, Yc), which have been read from the ROM 12, by using the inclination angle θ and calculates a position W' (Xw', Yw') of the shaft of the rear wheels 2, a position A' (Xa', Ya') of the second sensor 13, a position B' (Xb', Yb') of the first sensor 14, and an initial center-of-gravity position C' (Xc', Yc').

For example, the position W' (Xw', Yw') of the shaft of the rear wheels 2 is determined by using Expression 3 described below.

$$\begin{pmatrix} Xw' \\ Yw' \end{pmatrix} = \begin{pmatrix} \cos\theta & -\sin\theta \\ \sin\theta & \cos\theta \end{pmatrix} \begin{pmatrix} Xw \\ Yw \end{pmatrix} \quad \text{[Math. 3]}$$

Note that since the position W of the shaft of the rear wheels 2 is the position of the shaft of the rear wheels 2 when the stroller 100 is placed on a horizontal surface, the value Yw is 0 when the wheel diameters of the front wheels 1 and the rear wheels 2 are the same as one another. Thus, when the wheel diameters of the front wheels 1 and the rear wheels 2 are the same as one another, Expression 3 may be simplified to Xw'=cos θ×Xw, Yw'=sin θ×Xw.

Similarly, the position A' (Xa', Ya') of the second sensor 13, the position B' (Xb', Yb') of the first sensor 14, and the initial center-of-gravity position C' (Xc', Yc') are calculated on the basis of the inclination angle θ.

The stroller 100C calculates the center-of-gravity position Ct by using the values of the positions, which have been corrected by using the inclination angle θ. In the X-axis direction, when the center-of-gravity position Ct is located outside the region between the origin point and the position W' of the shaft of the rear wheels 2 when viewed from the vertical direction, that is, when the relationship of (0≤Xct≤Xw') is not satisfied, the stroller 100C switches on the lamp 15 and provides a warning. Note that the stroller 100C may provide a warning when the center-of-gravity position Ct is located beyond a predetermined safety region located between the origin point and the position W' of the shaft of the rear wheels 2 when viewed from the vertical direction.

It is desirable that the first sensor 14 and the second sensor 13 be configured to obtain the weight of the child 901 and the weight of the baggage 902 regardless of the inclination angle θ. When detected values vary depending on the inclination angle θ, the first sensor 14 and the second sensor 13 may correct the detected weights Fa and Fb by using the inclination angle θ. As a result, the weight of the child 901 and the weight of the baggage 902 may be calculated.

Although the above-described examples are intended to prevent a stroller from turning over in the positive depth direction and the negative depth direction, a stroller may be prevented from turning over in the width direction as described below.

Figure 10:
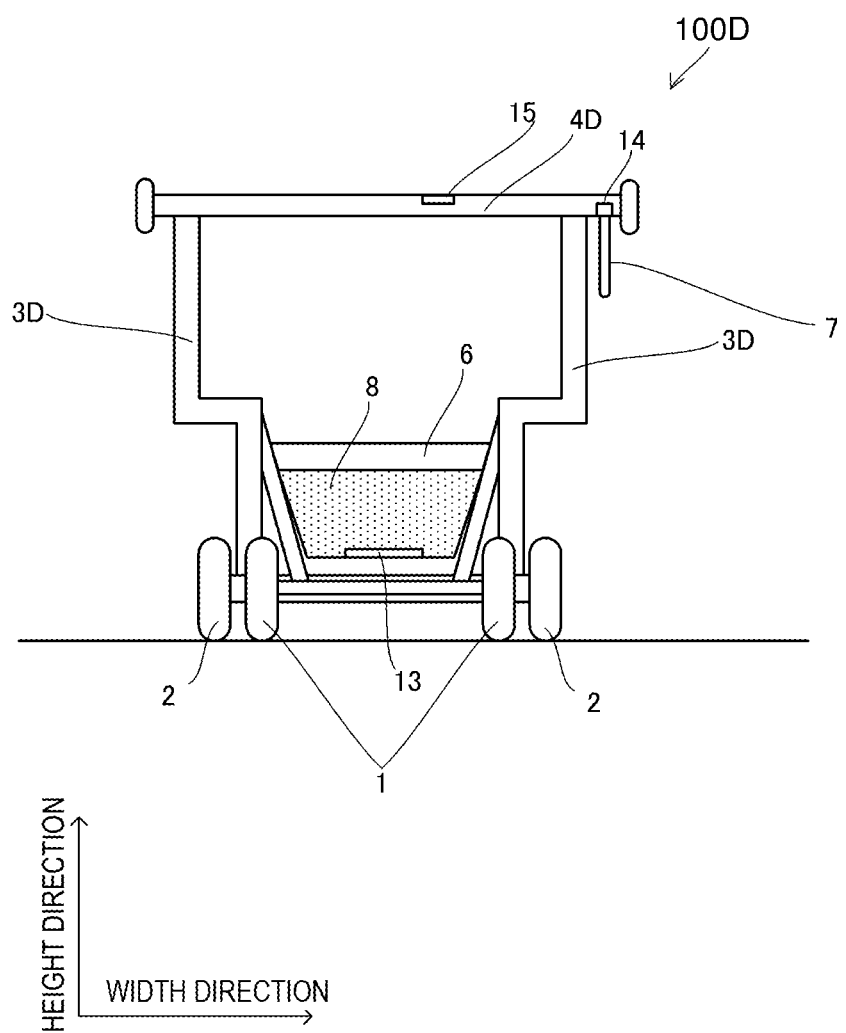
FIG. 10 is a front view of a stroller according to a fourth embodiment.

FIG. 10 is a front view of a stroller 100D according to a fourth embodiment. As illustrated in FIG. 10, the differences between the stroller 100D and the stroller 100 according to the first embodiment are as follows: a handle portion 4D is longer than the handle portion 4 in the width direction, upper portions of main frames 3D are widened outward in the width direction, and the pair of the hook 7 and the first sensor 14 is positioned outside the region between the pair of front wheels 1 and the pair of rear wheels 2 in the width direction. The description of the configuration of the stroller 100D that is the same as that of the stroller 100 will be omitted.

As illustrated in FIG. 10, which is the front view, the hook 7 is located outside the front wheels 1 and the rear wheels 2.

Accordingly, the stroller 100D calculates the center-of-gravity position of the entire stroller 100D in the width direction by using the weights on the seat 8 and the hook 7, and when the center-of-gravity position of the entire stroller 100D is located outside the region between the front wheels 1 and the rear wheels 2 when viewed from the vertical direction or when the center-of-gravity position of the entire stroller 100D is located outside a predetermined safety region when viewed from the vertical direction, the stroller 100D switches on the lamp 15 and provides a warning. However, in the present embodiment, in the width direction, the predetermined safety region is set to be within a region between the front wheels 1 or within a region between the pair of rear wheels 2 when viewed from the vertical direction. As a result, the stroller 100D can prevent the stroller 100D from turning over toward the side on which the hook 7 is disposed in the width direction.

Note that, similar to the stroller 100C according to the third embodiment, the stroller 100D may prevent the stroller 100D from turning over on the basis of the inclination angle of a road surface on which the stroller 100D is placed, the value Fa detected by the second sensor 13, and the value Fb detected by the first sensor 14. More specifically, in the stroller 100D, the inclination-angle sensor 16 is disposed so as to detect an inclination angle φ of the stroller 100D in a rolling direction, and the conditions (the gap between the rear wheels 2 and the like) under which the center-of-gravity position Ct of the entire stroller 100D is calculated are corrected by using the detected inclination angle φ.

Figure 11:
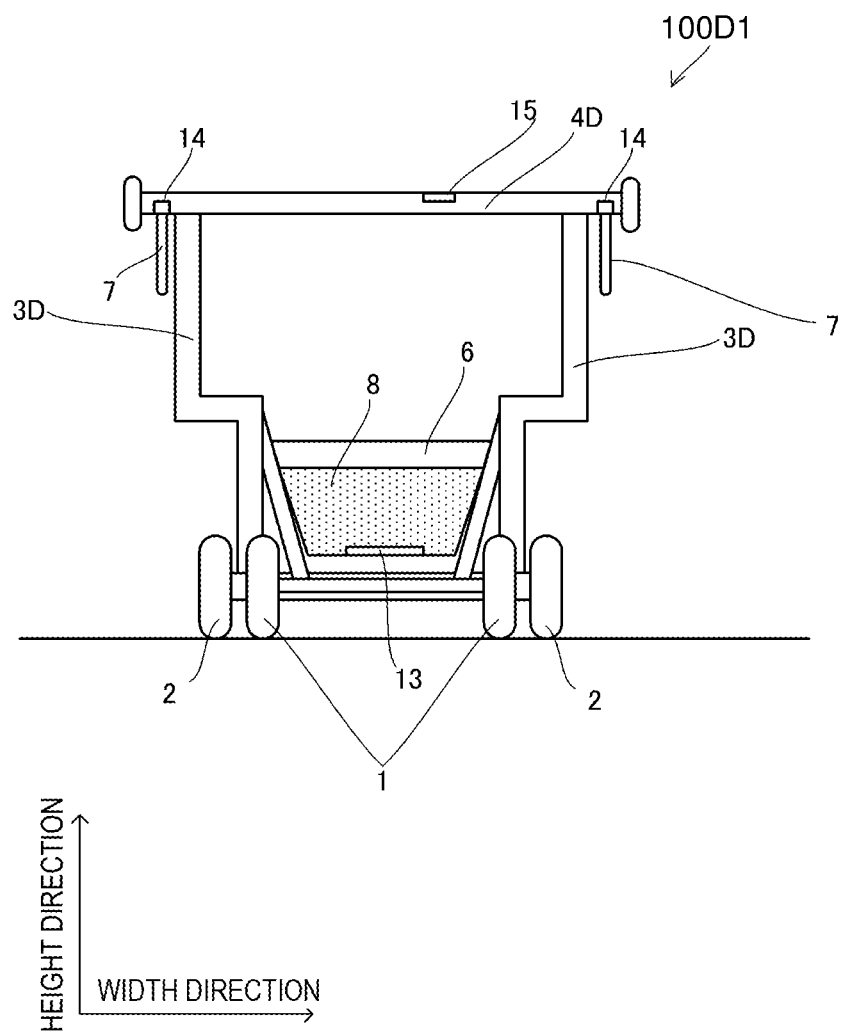
FIG. 11 is a front view of a stroller according to a modification of the stroller according to the fourth embodiment.

In addition, the stroller 100D may include a plurality of pairs of the hooks 7 and the first sensors 14. For example, as illustrated in FIG. 11, a stroller 100D1 according to a modification of the stroller 100D, includes the hooks 7 and the first sensors 14 disposed at the end portions of the handle portion 4D in the width direction. As a result, the stroller 100D1 can prevent the stroller 100D1 from turning over in the positive width direction and the negative width direction.

Figure 12:
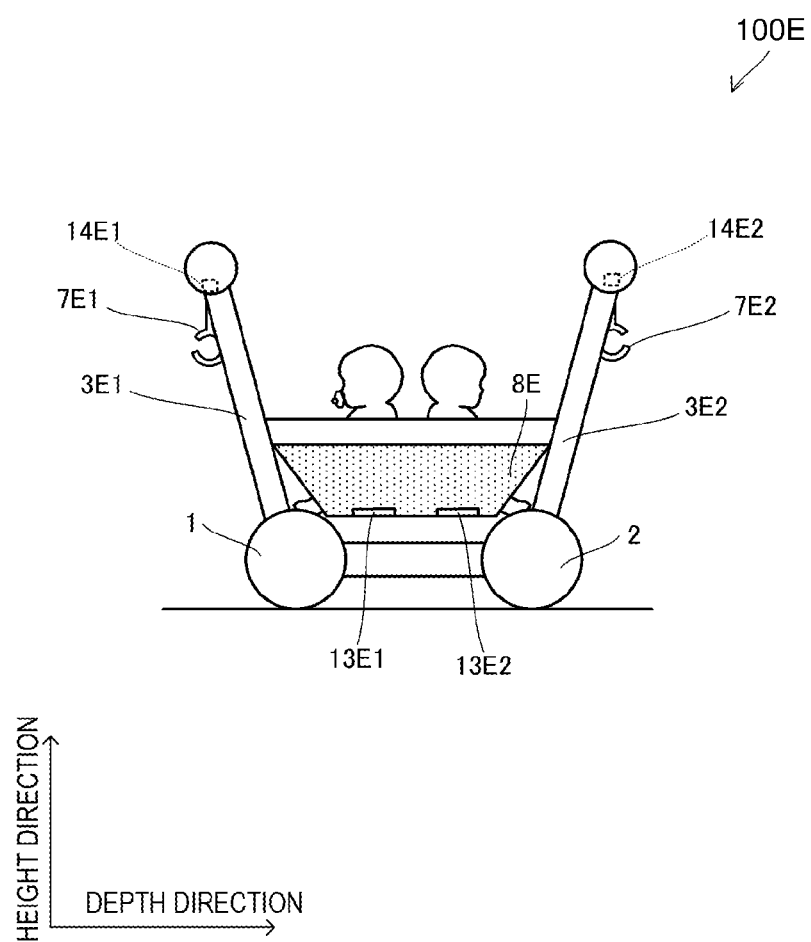
FIG. 12 is a side view of a multi-person stroller according to a fifth embodiment.

A stroller 100E according to a fifth embodiment will now be described with reference to FIG. 12. FIG. 12 is a side view of the multi-person stroller 100E.

As illustrated in FIG. 12, the multi-person stroller 100E is configured to accommodate two or more children who are arranged side by side in the depth direction. In a seat 8E, a second sensor 13E1 and a second sensor 13E2 are disposed at locations to each of which the weight of one of the children is applied.

The multi-person stroller 100E includes first main frames 3E1, whose lower ends are fixed to the shaft of the front wheels 1 and whose upper ends are inclined in the negative depth direction, and second main frames 3E2, whose lower ends are fixed to the shaft of the rear wheels 2 and whose upper ends are inclined in the positive depth direction.

A hook 7E1 is provided above the first main frames 3E1. A first sensor 14E1 is disposed on the top surface of the hook 7E1. A hook 7E2 is provided above the second main frames 3E2. A second sensor 14E2 is disposed on the top surface of the hook 7E2.

When a user uses the multi-person stroller 100E, the user hangs baggage on the hook 7E1 and the hook 7E2. Even with the above-described configuration, the multi-person stroller 100E calculates the center-of-gravity position of the entire multi-person stroller 100E by using values detected by the first sensor 14E1, the first sensor 14E2, the second sensor 13E1, and the second sensor 13E2 and provides a warning when the center-of-gravity position of the entire multi-person stroller 100E is located outside the region between the shaft of the front wheels 1 and the shaft of the rear wheels 2 when viewed from the vertical direction, so that the multi-person stroller 100E can prevent the multi-person stroller 100E from turning over in the positive depth direction and the negative depth direction without necessarily increasing the total weight of the multi-person stroller 100E. Note that, in the present embodiment, although the two first sensors, which are the first sensor 14E1 and the first sensor 14E2, are used in the seat 8E, the weights of children may be detected by using only one first sensor. However, it is preferable that a plurality of first sensors be used so as to correspond to the positions of a plurality of children for accurate detection.

Figure 13:
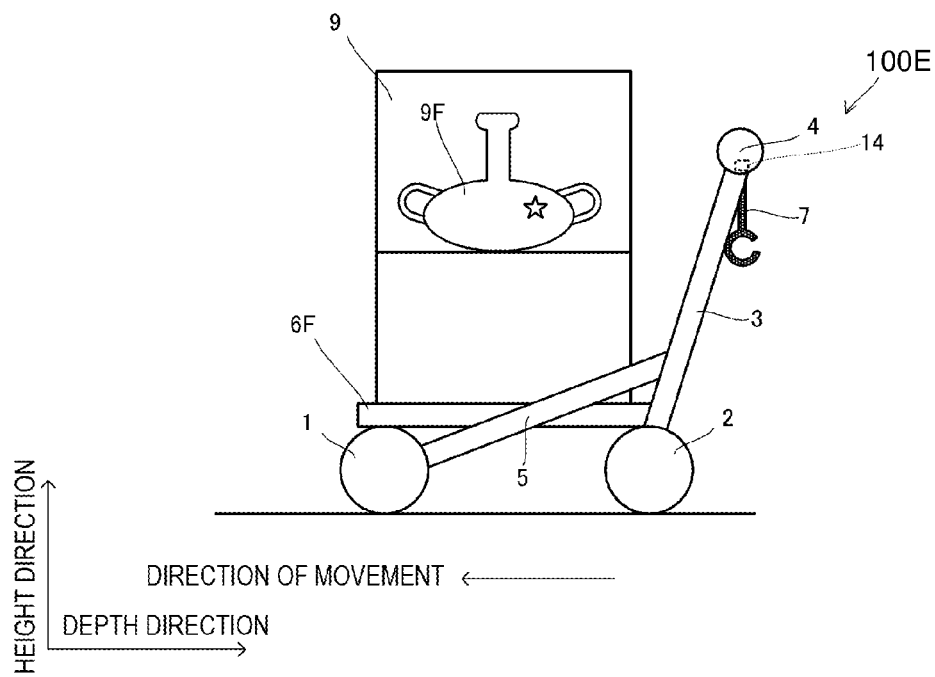
FIG. 13 is a side view of a wheeled display table according to a sixth embodiment.
Figure 14:
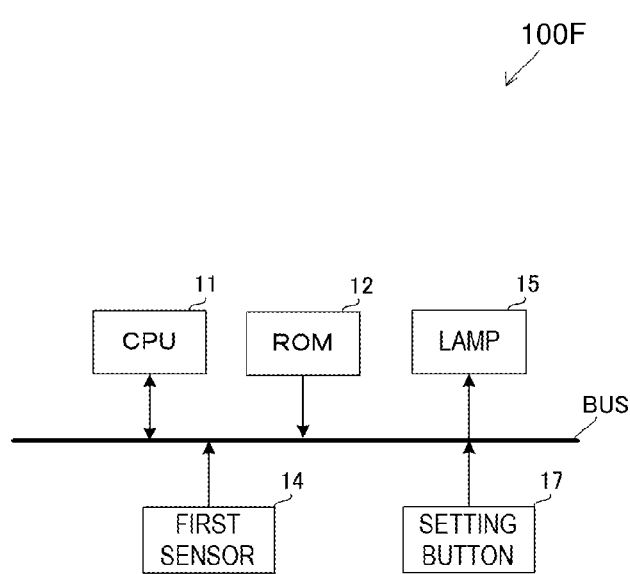
FIG. 14 is a block diagram illustrating part of the configuration of the wheeled display table according to the sixth embodiment.

A wheeled display table 100F according to a sixth embodiment will now be described with reference to FIG. 13 and FIG. 14. FIG. 13 is a side view of the wheeled display table 100F. FIG. 14 is a block diagram illustrating part of the configuration of the wheeled display table 100F.

As illustrated in FIG. 13 and FIG. 14, the differences between the wheeled display table 100F according to the sixth embodiment and the stroller 100 according to the first embodiment are as follows: a display case 9 is fixedly placed on a placement table 6F between the front wheels 1 and the rear wheels 2, the wheeled display table 100F does not include the second sensor 13, and the wheeled display table 100F includes a setting button 17. In other words, the wheeled display table 100F does not include the second sensor 13 because the weight of the display case 9 disposed between the front wheels 1 and the rear wheels 2 does not change.

The setting button 17 is connected to the BUS common to the components such as the CPU 11. The setting button 17 outputs a signal representing weight to the CPU 11 as a result of receiving an input operation. The weight corresponds to the predetermined weight according to the present disclosure. In the present embodiment, a user inputs the weight of the display case 9 including the weight of a display item 9F. The weight of the display case 9 corresponds to the detected value Fa according to the first to fifth embodiments.

The CPU 11 switches on the lamp 15 on the basis of the weight input from the setting button 17 and the detected value Fb detected by the first sensor 14. For example, the CPU 11 switches on the lamp 15 when the detected value Fb exceeds a predetermined threshold and is larger than the weight input from the setting button 17.

However, like the stroller 100 according to the first embodiment, the wheeled display table 100F may switch on the lamp 15 when the center-of-gravity position thereof is located outside the safety region R. More specifically, the total weight of the wheeled display table 100F and the initial center-of-gravity position C are input to the setting button 17. Then, the wheeled display table 100F updates the initial center-of-gravity position C to the last center-of-gravity position Ct by using the detected value Fb detected by the first sensor 14. The wheeled display table 100F switches on the lamp 15 when the value Xct of the updated center-of-gravity position Ct in the X-axis direction is not within the safety region R.

As described above, even in the case where the wheeled display table 100F does not include the second sensor 13, the wheeled display table 100F can prevent the wheeled display table 100F from turning over without necessarily increasing the total weight of the wheeled display table 100F.

Note that, in the wheeled display table 100F, the weight of the display case 9 may be input as a result of an input operation being performed on the setting button 17, and alternatively, the weight of the display case 9 may be input as a result of the wheeled display table 100F receiving the weight of the display case 9 by using a wireless communication standard.

However, it is optional to include a component such as the setting button 17, to which a predetermined weight is input, in the wheeled display table 100F. The wheeled display table 100F may store the predetermined weight in the ROM 12 beforehand.

In addition, the above-described technical features can be combined. For example, the wheeled display table 100F may include the support members 20 of the stroller 100A. Furthermore, the wheeled display table 100F may include the inclination-angle sensor 16 and may calculate the center-of-gravity position Ct in accordance with the inclination angle θ.

REFERENCE SIGNS LIST 1 front wheel
2 rear wheel
3, 3D main frame
3E1 first main frame
3E2 second main frame
4, 4D handle portion
5 sub frame
6 seat-holding frame
6F placement table
7, 7E1, 7E2 hook
8, 8E seat
9 display case
11 CPU
12 ROM
13, 13E1, 13E2 second sensor
14, 14E1, 14E2 first sensor
15 lamp
16 inclination-angle sensor
17 setting button
20 support member
21 locking mechanism
21A actuator
100, 100A, 100C, 100D, 100D1 stroller
100B bidirectional stroller
100E multi-person stroller
100F wheeled display table

The invention claimed is:

1. A pushcart comprising:
   first wheels;
   second wheels;
   a first mounting portion located outside a region between a shaft of the first wheels and a shaft of the second wheels when viewed from a vertical direction;
   a first sensor that detects a first weight on the first mounting portion; and
   an informing unit that provides a warning based on the first weight detected by the first sensor and a predetermined weight,
   wherein the informing unit calculates a position of the center of gravity of the pushcart based on the first weight and the predetermined weight and provides the warning when the position of the center of gravity, which has been calculated, is outside the region between the shaft of the first wheels and the shaft of the second wheels when viewed from the vertical direction.

2. A pushcart comprising:
   first wheels;
   second wheels;
   a first mounting portion located outside a region between a shaft of the first wheels and a shaft of the second wheels when viewed from a vertical direction;
   a first sensor that detects a first weight on the first mounting portion; and
   an informing unit that provides a warning based on the first weight detected by the first sensor and a predetermined weight,
   wherein the informing unit calculates the position of the center of gravity of the pushcart based on the first weight and the predetermined weight and provides the warning when the position of the center of gravity, which has been calculated, is outside a predetermined region when viewed from the vertical direction, and
   wherein the predetermined region is set within the region between the shaft of the first wheels and the shaft of the second wheels when viewed from the vertical direction.

3. A pushcart comprising:
   a support member whose first end is attached to the pushcart;
   first wheels;
   second wheels;
   a first mounting portion located outside a region between a shaft of the first wheels and a shaft of the second wheels when viewed from a vertical direction;
   a first sensor that detects a first weight on the first mounting portion; and
   a turnover preventing portion that causes a second end of the support member to move so as to be outside the region based on the first weight detected by the first sensor and a predetermined weight.

4. The pushcart according to claim 3,
   wherein the turnover preventing portion calculates a position of the center of gravity of the pushcart based on the first weight and the predetermined weight and causes the second end of the support member to move so as to be outside the region when the position of the center of gravity, which has been calculated, is outside the region between the shaft of the first wheels and the shaft of the second wheels when viewed from the vertical direction.

5. The pushcart according to claim 3,
   wherein the turnover preventing portion calculates a position of the center of gravity of the pushcart based on the first weight and the predetermined weight and causes the second end of the support member to move so as to be outside the region when the position of the center of gravity, which has been calculated, is outside a predetermined region when viewed from the vertical direction, and
   wherein the predetermined region is set within the region between the shaft of the first wheels and the shaft of the second wheels when viewed from the vertical direction.

6. The pushcart according to claim 3, further comprising:
   an inclination-angle sensor that detects an inclination angle of the pushcart,
   wherein the turnover preventing portion causes the second end of the support member to move so as to be outside the region based on an inclination angle detected by the inclination-angle sensor, the first weight, and the predetermined weight.

7. The pushcart according to claim 1, further comprising:
   a second mounting portion located between the shaft of the first wheels and the shaft of the second wheels when viewed from the vertical direction; and
   a second sensor that detects, as a predetermined weight, a second weight on the second mounting portion.

8. The pushcart according to claim 1, further comprising:
   an input unit into which the predetermined weight is input.

9. The pushcart according to claim 1, further comprising:
   an inclination-angle sensor that detects an inclination angle of the pushcart,
   wherein the informing unit provides the warning based on an inclination angle detected by the inclination-angle sensor, the first weight, and the predetermined weight.

10. The pushcart according to claim 2, further comprising:
    an inclination-angle sensor that detects an inclination angle of the pushcart,
    wherein the informing unit provides the warning based on an inclination angle detected by the inclination-angle sensor, the first weight, and the predetermined weight.

11. The pushcart according to claim 4, further comprising:
    an inclination-angle sensor that detects an inclination angle of the pushcart,
    wherein the turnover preventing portion causes the second end of the support member to move so as to be outside the region based on an inclination angle detected by the inclination-angle sensor, the first weight, and the predetermined weight.

12. The pushcart according to claim 5, further comprising:
    an inclination-angle sensor that detects an inclination angle of the pushcart,
    wherein the turnover preventing portion causes the second end of the support member to move so as to be outside the region based on an inclination angle detected by the inclination-angle sensor, the first weight, and the predetermined weight.

13. The pushcart according to claim 1, further comprising:
    a second mounting portion located between the shaft of the first wheels and the shaft of the second wheels when viewed from the vertical direction; and
    a second sensor that detects, as a predetermined weight, a second weight on the second mounting portion.

14. The pushcart according to claim 2, further comprising:
    a second mounting portion located between the shaft of the first wheels and the shaft of the second wheels when viewed from the vertical direction; and
    a second sensor that detects, as a predetermined weight, a second weight on the second mounting portion.

15. The pushcart according to claim 9, further comprising:
a second mounting portion located between the shaft of the first wheels and the shaft of the second wheels when viewed from the vertical direction; and
a second sensor that detects, as a predetermined weight, a second weight on the second mounting portion.

16. The pushcart according to claim 3, further comprising:
a second mounting portion located between the shaft of the first wheels and the shaft of the second wheels when viewed from the vertical direction; and
a second sensor that detects, as a predetermined weight, a second weight on the second mounting portion.

17. The pushcart according to claim 4, further comprising:
a second mounting portion located between the shaft of the first wheels and the shaft of the second wheels when viewed from the vertical direction; and
a second sensor that detects, as a predetermined weight, a second weight on the second mounting portion.

18. The pushcart according to claim 5, further comprising:
a second mounting portion located between the shaft of the first wheels and the shaft of the second wheels when viewed from the vertical direction; and
a second sensor that detects, as a predetermined weight, a second weight on the second mounting portion.

* * * * *